United States Patent [19]
Frauenthal et al.

[11] Patent Number: 4,737,983
[45] Date of Patent: Apr. 12, 1988

[54] AUTOMATIC CALL DISTRIBUTOR TELEPHONE SERVICE

[75] Inventors: James C. Frauenthal, Colts Neck; William L. Gewirtz, Edison; Thomas G. Moore, Freehold; Roy P. Weber, Bridgewater, all of N.J.

[73] Assignee: American Telephone and Telegraph Company Communications, Inc., Basking Ridge, N.J.

[21] Appl. No.: 783,242

[22] Filed: Oct. 2, 1985

[51] Int. Cl.$^4$ ............................................. H04M 7/00
[52] U.S. Cl. .................................... 379/221; 379/113; 379/223; 379/265
[58] Field of Search ................ 179/8 A, 18 B, 18 EA, 179/27 D, 9, 10, 27 DB, 27 C; 379/34, 113, 133, 211, 213, 265, 266, 297, 308, 309, 221, 223, 207

[56] References Cited

U.S. PATENT DOCUMENTS

| | | | |
|---|---|---|---|
| 3,111,561 | 11/1963 | Dunning | 379/82 |
| 3,542,961 | 11/1970 | Klein et al. | 379/221 X |
| 4,191,860 | 3/1980 | Weber | 379/115 |
| 4,400,587 | 8/1983 | Taylor et al. | 379/221 X |
| 4,510,351 | 4/1985 | Costello et al. | 379/34 |
| 4,611,094 | 3/1986 | Asmuth et al. | 379/34 |
| 4,669,113 | 5/1987 | Ash et al. | 379/113 X |
| 4,670,899 | 6/1987 | Brady et al. | 379/60 |

Primary Examiner—James L. Dwyer
Attorney, Agent, or Firm—Jerry W. Herndon

[57] ABSTRACT

A method of balancing traffic loads to a plurality of customer automatic call distributors (ACDs). Each ACD periodically transmits call congestion data to a central data base. Periodically, the data is automatically analyzed and resulting call routing information stored at the data base. The call routing information is queried in response to each call directed to the customer to select and ACD for routing of the call. Other signals are independently sent from the ACDs to the data base to indicate the present availability of trunks. A given call may or may not be routed to the selected ACD depending upon the status of these signals. In this case, the ACD selection process is repeated at the data base.

16 Claims, 5 Drawing Sheets

ACD CALL CONGESTION DATA

```
OPERATORS WORKING: S
CALLS IN SYSTEM: N
AVERAGE HOLDING TIME: T
           o
           o
           o
```

FIG. 6 m = 1
1. RANK1
2. RANK1
3. RANK1
   o
   o
   o
   o
   o
   o
N. RANK1 m = 2
1. RANK1
2. RANK1
3. RANK2
4. RANK1
   o
   o
   o
   o
   o
N. RANK2 o o o m = 10
1. RANK1
2. RANK2
3. RANK1
4. RANK3
   o
   o
   o
N-2. RANK5
N-1. RANK9
N. RANK10

FIG. 5

AUTOMATIC CALL DISTRIBUTOR TELEPHONE SERVICE

TECHNICAL FIELD

The invention relates generally to the field of telephony and particularly to methods of balancing the distribution of calls between ones of a plurality of automatic call distributors (ACDs) servicing, for example, a single customer.

BACKGROUND OF THE INVENTION

Many relatively large companies provide call-in services for the convenience of their customers or potential customers. Reservation and information services provided by many airlines are examples of such services. Typically, such companies maintain a number of ACDs geographically dispersed according to the scope of operations of the company. It is highly desirable, both for reasons of service quality to customers and for company administrative matters, that call loads to the ACDs be relatively balanced. However, in many cases no attempt is made to accomplish this because of the present high cost required to do this. For example, in one form of 800 service presently available (see U.S. Pat. No. 4,191,860, "Data Base Communication Call Processing Method", which issued to R. P. Weber on Mar. 4, 1985), calls may be allocated to individual ACDs on a percentage basis as specified by a customer. However, this is a fixed percentage allocation having no capability to dynamically adapt to variable conditions for load balancing. In other cases, load balancing is attempted, but inadequately accomplished by semiautomatic means. In one arrangement, each ACD automatically overflows calls to another ACD when its call congestion rises to a predetermined level. This, of course, is expensive because it requires trunking between the ACDs. In some cases, switching has been provided between the ACDs to reduce the trunking cost. In either event, however, the additional trunking degrades the quality of communication. Furthermore, the automatic overflow of calls does not necessarily aid the problem. In fact, it may worsen the problem because the overflowing ACD has no knowledge of the congestion of the ACD to which overflow is made.

Traffic control centers have occasionally been used in an attempt to solve this last problem. In such an arrangement, each ACD periodically transmits status information to a dedicated terminal at the center via a private data line. The status information on each terminal is recorded and analyzed by a center attendant to determine capacity thresholds and overflow ACDs for each of the ACDs. This information is then transmitted to the appropriate ACDs by the attendant. When a call arrives at an ACD, the ACD determines if its then present capacity threshold is exceeded. If so, the ACD queries the first overflow ACD to see if it can accept the call without overflowing that ACD's threshold. The call is then overflowed to this ACD if the answer is yes. Otherwise, the next overflow ACD, if any, is queried, and so on.

One difficulty with the traffic control center approach is that it has proven to be too slow. The threshold and overflow routing data available to an ACD at any given time does not necessarily reflect the present congestion state of the ACD network. Perhaps more important, however, is that the traffic control center approach still requires trunking between the individual ACDs along with the attendant additional cost and degraded communications.

SUMMARY OF THE INVENTION

The foregoing problems are solved and an advance in the art is obtained in a method of processing calls directed to a customer's ACDs so as to balance automatically and dynamically the load between the ACDs. A telephone system including the ACDs comprises a plurality of switching offices and a data base accessible to the offices and to the ACDs. The method comprises the steps of repetitively accumulating data at the data base from each of the ACDs describing the present call congestion state of the ACD, repetitively analyzing the data to generate call routing information to balance calls between the ACDs and in response to a call directed to the customer, querying the call routing information to select a specific ACD to which to route the call.

In a preferred embodiment, each ACD repetitively accumulates data representing the present ACD call congestion state and transmits the data to the data base or an intermediate processor. In response to a call at one of the offices directed to the ACD customer, the office queries the data base for instructions as to how to route the call. The query includes a number identifying the customer. The data base determines from the present ACD congestion data a preferred ACD to which to route the call and returns a corresponding telephone number to the office, which routes the call accordingly.

Periodically, the congestion data from the ACDs is analyzed and the result is an updated call routing table, which is stored at the data base. This table contains entries identifying ACDs in the order and proportion required to properly balance the traffic. A pointer is maintained to the next entry in the table to be initially selected in response to the next call routing query. A program at the data base is executed in response to a call routing query. It uses the pointer initially to access the next call routing table entry. It then may perform tests to determine if this call should actually be routed to the selected ACD. One test, for example, is whether or not any trunks are presently available at this instant at the selected ACD to receive the call. This test is performed using busy/idle data separately sent from the ACDs. Another test may select different telephone routing numbers for the ACD, depending upon whether the call is intrastate or interstate.

DETAILED DESCRIPTION

An 800 call service referred to as INWATS (Inward Wide Area Telephone Service) is described in U.S. Pat. No. 4,191,860, which issued to R. P. Weber on Mar. 4, 1980. The disclosure of this patent is hereby incorporated in its entirety by reference.

We will refer to the call method described herein as Call Distributor Service (CDS).

Figure 1:
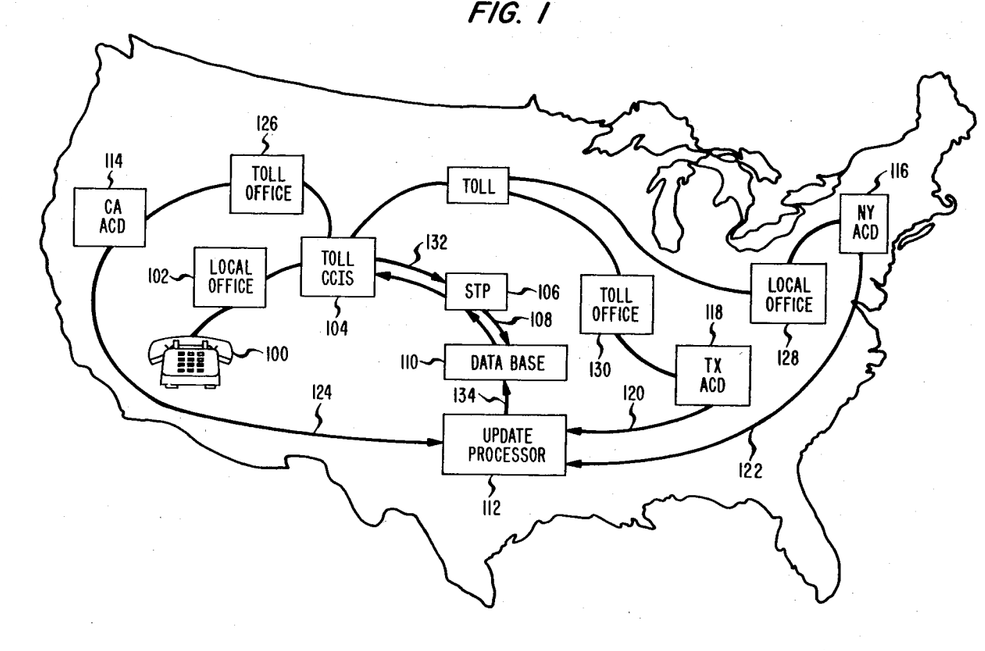
FIG. 1 shows, in block diagram form, an illustrative configuration of switching offices, ACDs, CCIS and signal transfer facilities together with one of several data bases illustratively for serving INWATS ACD calls in the United States.

In FIG. 1, the processing of a call to an INWATS ACD customer is explained by assuming that the call is originated from a calling station 100 in California. The INWATS customer is assigned a single customer number which is dialed by callers on all calls to that customer, regardless of their place of origination. The number illustratively comprises ten digits including an 800 area code portion followed by seven digits NXX-XXXX. The "N" digit is any value 2–9 and each of the "X" digits is any value 0–9. Employing conventional methods, number translations within the network route a query to a data base, such as data base 110 in Texas, which stores the INWATS customer data utilized for processing the call to an appropriate destination. The NXX-XXXX digits identify the INWATS customer within the data base.

For the exemplary embodiment, call processing is described by assuming that the call may be routed to any one of three destinations, namely the INWATS customer's premises automatic call distribution (ACD) equipment 116, 114 or 118 located in New York, California and Texas, respectively. Each such ACD is assumed to be capable of connecting arriving calls to operators logged onto the ACD, queueing calls and providing announcements in the event that all operators are busy with calls, and doing internal record keeping concerning the status of the ACD. A typical ACD system is disclosed, for example, in S. F. Dunning, U.S. Pat. No. 3,111,561 of Nov. 19, 1963. The three destination ACDs will suffice to explain typical call situations encountering operator/traffic imbalances and the operation of the invention to overcome these imbalances.

After station 100 initiates a call via a local switching office 102 and dials the INWATS customer number, conventional methods are used to transport the dialed INWATS number and area code of origination of the call in California to a toll office 104. Call routing details are disclosed, for example, in the aforementioned Weber patent. The toll office 104 is equipped with Common Channel Interoffice Signaling (CCIS) facilities. Toll office 104 formulates an INWATS CCIS query message including an identification of the office 104, the dialed INWATS number and the area code of the call originator, and sends this message over CCIS link 132 to a signal transfer point (STP), system 106. This, in turn, responds to the received message by determining from the INWATS number that data base 110, illustratively located in Dallas, Texas, contains the call routing translations. System 106 then forwards the CCIS message to data base 110 over CCIS link 108. System 106 is a packet switching system for CCIS applications. Packet switching facilities are disclosed for example in A. G. Fraser, U.S. Pat. No. 3,749,845 of July 31, 1973 and 3,979,733 of Sep. 7, 1976. Structure and operations of CCIS are described, by way of example, in the 57 *Bell System Technical Journal,* No. 2, pp. 230, et seq. Thus, the query is processed from the toll telephone switching network to a data base for deriving call service information.

Data base system 110 is, by way of example, a commercially available system, such as a Western Electric Company, Incorporated 1A processor (disclosed in 56 *Bell System Technical Journal,* No. 7, February 1977, equipped with disk storage and a system of programs to establish, edit and manage information stored in memory. It is equipped via a peripheral unit bus disclosed in 57 *Bell System Technical Journal,* No. 2, February 1978) with CCIS facilities for interface communication with the signal transfer system 106 and the to 110 network. System 11 is responsive to the received INWATS number and originating area code for deriving all of the stored information needed for processing the call to an idle and available INWATS customer station designed as the preferred called station to serve the call. The information includes data for the active-inactive status of the dialed INWATS number, the storage files associated with the active number, the inband/out-band character of the call based on the received originating area code, and a directory-unlisted POTS (plain old telephone service) number of a destination subsystem or station.

INWATS service customers with two or more ACDs may choose to have their arriving traffic routed using Call Distributor Service (CDS). Such customers would have stored within data base 110 a table 200 such as the one shown in FIG. 2. This table is established at the time of service provisioning, and associates with each destination ACD, one or more non-dialable POTS (plain old telephone service) numbers, each one of which corresponds with a group of one or more trunks from a terminating office to the ACD. The terminating offices corresponding with the ACDs, 116, 114 and 118, are, respectively, 128, 126 and 130.

Figure 2:
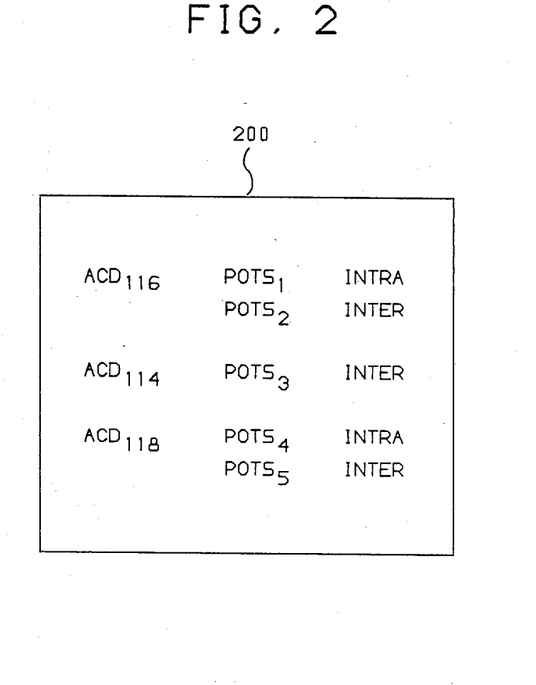
FIG. 2 shows a table stored at the data base which contains telephone routing numbers for associated ACDs.

The details of the allowable table entries at the present time depend in part on regulatory tariff restrictions. For the illustration, ACD 116 in New York and ACD 118 in Texas are required by tariff to provide separate trunk groups for interstate and intrastate calls. Thus, two telephone numbers, one for interstate and one for intrastate are contained within the table for these ACDs. For illustrative purposes, ACD 114 in California is shown to allow both intrastate and interstate calls to arrive on a single trunk group.

Figure 3:
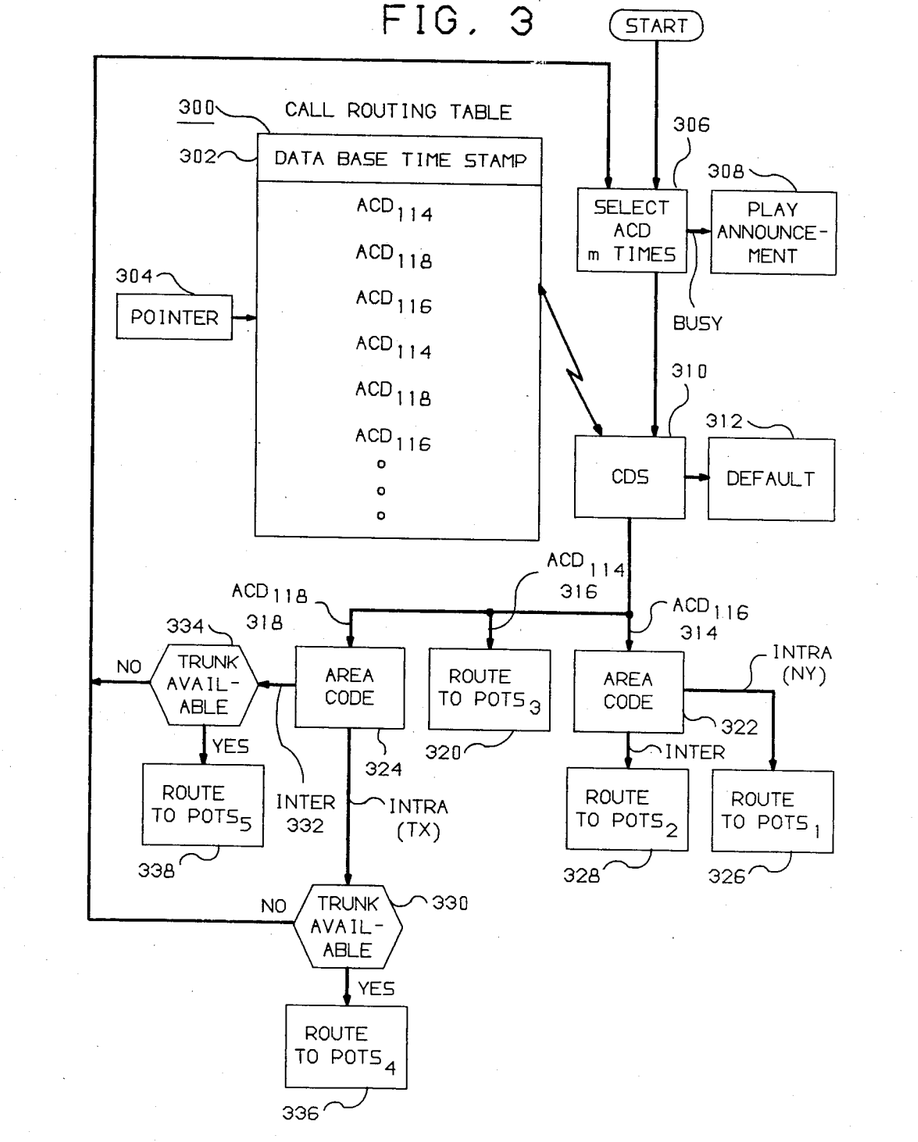
FIG. 3 shows a call routing table and a program which selects ACDs from the call routing table in response to successive ACD calls to the customer.

FIG. 3 illustrates the operation of Call Distributor Service for the INWATS customer shown in FIG. 1. It shows the logical flow of a program stored at data base 110 which is executed to determine the routing of this call in response to a CCIS message arriving at the data base 110. This message identifies the area code of origin of the call which awaits routing and an identification of the INWATS customer which, in turn, identifies the program. The generation and execution of a program such as shown in FIG. 3 are described fully in a copending application entitled "Method for Customer Definable Telephone Capability," U.S. Pat. No. 4,611,094, issued in the names of R. L. Asmuth et al on Sept. 9, 1986. The disclosure of this application is incorporated by reference herein.

Data base 110 recognizes from the customer number in the query the program shown in FIG. 3 as being associated with this query. The first node 306 of the program contains a parameter which is selected by the INWATS customer and which determines how many times the CDS node 310 will be repeated in an effort to find a destination for the call. If after the stated number of tries a destination has not been found, the logic follows the busy branch to node 308, which causes the caller in California to hear either a busy tone or an announcement, typically, to the effect that all operators are currently busy.

The CDS node 310 is conceptually associated with table 300 in FIG. 3. Table 300 is transmitted to the data base periodically (typically, one to three times per minute) by an update processor (UP) 112, shown in FIG. 1. The operation of the update processor is detailed below. Table 300 contains a time stamp 302 indication when it was received at the data base and a listing of ACDs for this customer. The ACDs appear in an order and frequency that reflect their present ability to accept traffic. Each entry provides a starting point of a preferred ACD to be used for routing of successive calls to this customer. A pointer 304 maintained at the data base 110 points to the next ACD to be initially tried on the next call to this customer.

At the time of arrival of the call routing table 300 at data base 110 from UP 112, the data base applies the local time stamp 302 so the age of the table can be monitored. If at the time it is examined by data base 110, table 300 has a time stamp 302 which is older than a specified amount (typically two to three times the interval between periodic deliveries of such tables by the UP) then the branch from node 310 to default node 312 is followed. In this case, call processing continues, for example, as disclosed in the aforementioned patent. This operation is not pertinent to the invention and need not be discussed further.

If the time stamp is still current, CDS node 310 first follows one of the branches 314, 316, 318 associated with ACD116, ACD114 and ACD118, respectively, depending upon the location of the pointer 304 in table 300. As mentioned above, this pointer is a logical marker whose location is controlled by the software running in data base 110. In FIG. 3, it is illustratively shown pointing to the Texas ACD 118. The program therefore follows branch 318 in FIG. 3, which begins with a node 324 labeled area code. This node causes a comparison to be made between the area code of origin of the call (which is contained in the CCIS message) and that of the ACD to decide whether the call is intrastate or interstate. In this example, since the call is from California and ACD 118 is in Texas, the logic chooses branch 332 labeled inter, and goes to a decision node 334 called line available. Node 334 determines whether or not a trunk at the presently selected ACD 118 is available. This determination is made by maintaining a running count which is compared to a number, less than or equal to the actual number of trunks to the ACD, specified by the customer and stored at the data base. Counter incrementing or decrementing information is provided to the data base by the office serving the ACD. For receiving the incrementing and decrementing information at data base 110, there is a data connection via CCIS from toll office 130 to data base 110. This connection is not shown in FIG. 1 for simplicity.

If a trunk at ACD 118 is available, then the yes branch from node 334 is followed to call routing node 338. The outcome is that a decision has been made to route the call to POTS number 5. Using techniques disclosed in the above-mentioned Asmuth Patent, this decision is translated into instructions which are returned through the CCIS network to the telephone office.

At node 334, if no line is available, then the branch labeled no is followed and the logic returns to the beginning of the program at node 306. Node 306 checks a parameter m specified by the customer to determine how many times the program may be executed on a given call to select an ACD. If the customer had specified at node 306 that the program could not be traversed more than once (m=1), then the busy branch would be followed from node 306. If m is greater than 1, then the pointer 304 in the Call Routing Table 300 would be moved down one line so it would now point to ACD 116, and the CDS node 310 would dictate that the branch 314 to the New York ACD 116 be executed.

Notice that the nodes in branch 314 are identical to those in branch 318 except that the line available decision nodes are not included. The consequence is that the call will be routed, whether or not there is a line available. The outcome, if there is no line available, is that the calling party will be returned a busy tone by the network, but only after it attempts to set up the call to ACD 116. Also note that since in this illustration the call would be identified as an interstate call, the availability of intrastate lines is irrelevant.

Logic branch 316 illustrates a third possible illustrative situation in this example, consistent with the information in table 200 of FIG. 2. For the California ACD 114, no determination is made for call routing purposes as to whether the call is intrastate or interstate. A single trunk group, in this example without a line availability check, is used to route calls to ACD 114.

We turn now to the Update Processor 112, shown in FIG. 1. Update processor 112 is shown as being separate from the data base 110 in FIG. 1. This is for convenience. Obviously UP 112 and data base 110 may or may not be included in one entity as desired by a system designer. Update processor 112 has three main functions. It receives call congestion status information from the ACDs via data connections 122, 124 and 120. The status information flows from ACDs 116, 114 and 118 along data connections 122, 124 and 120, respectively, to the update processor 112. These connections represent channels, illustratively either in the Accunet packet network or the CCIS network, on which packetized data is transmitted. This data is sent by the respective ACDs, or their conventional attached or centralized management information system, along a permanent virtual circuit or its equivalent, to buffers maintained in the UP 112. It processes the ACD status data so as to create the Call Routing Table which determines the sequence according to which calls are routed to the available ACDs. It transmits this table along data connection 134 to the data base 110.

It is important to observe that the status information represents all traffic coming to the ACD, and not just INWATS traffic. Although the CDS does not have control over say foreign exchange (FX) or local traffic, it does alter INWATS call routing in response to this traffic.

Figure 4:
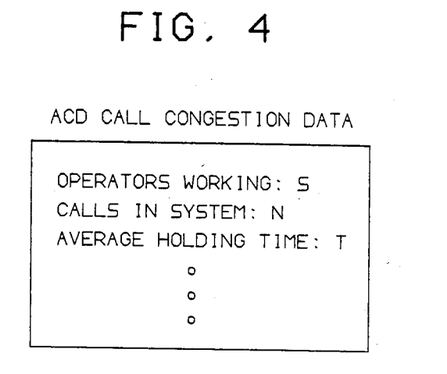
FIG. 4 shows illustrative call congestion data received from each of a customer's ACDs.

FIG. 4 shows an illustration of the type of data 500 which is transmitted by each ACD to the UP. Typical data elements include, but are not limited to, the number of operators working, the number of calls in the system (in service plus in queue) and the average holding time of the calls in service. This information is transmitted periodically to UP 112 (typically, two to six times per minute).

Figure 5:
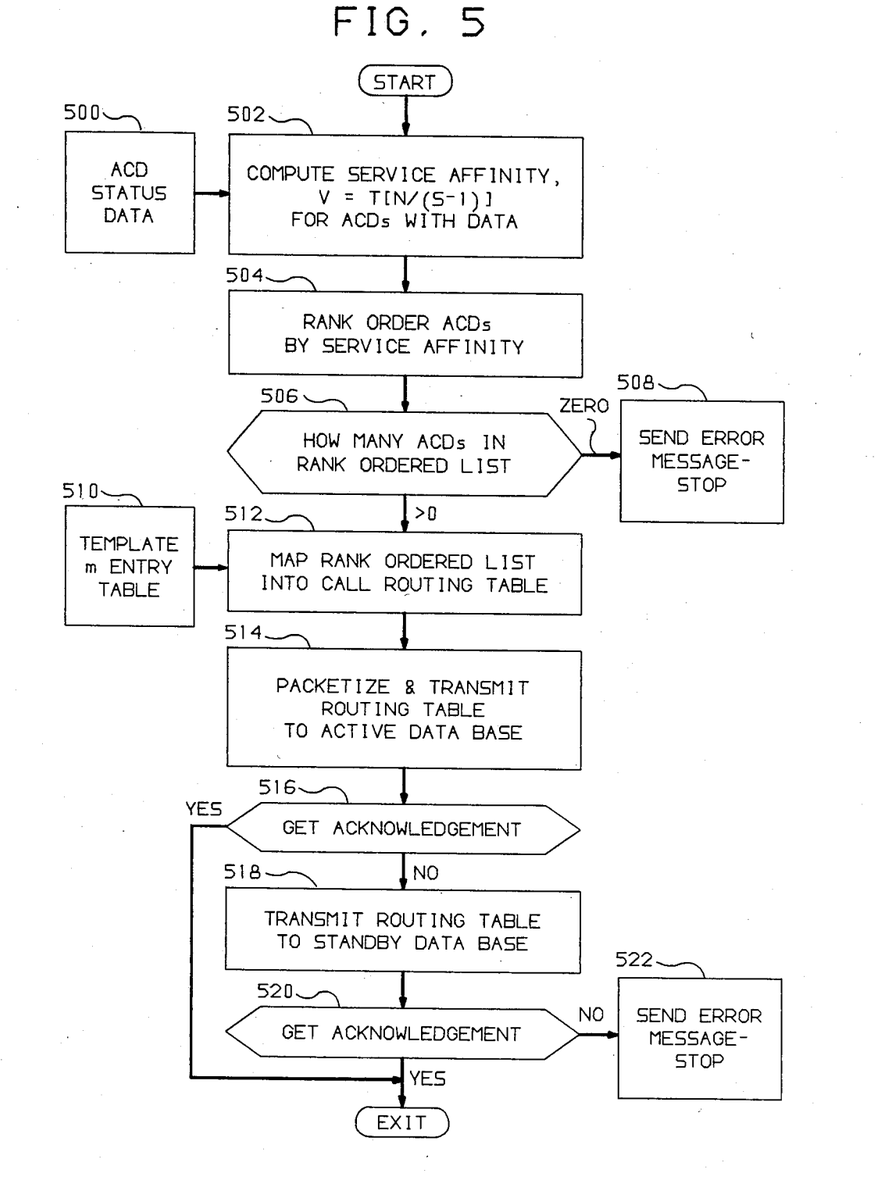
FIG. 5 is a flowchart of an algorithm which is periodically executed to generate the call routing table of FIG. 3.

FIG. 5 shows the logical flow within the UP which transforms the status data illustrated in FIG. 4 into a Call Routing Tables, such as the one shown in Table 300 of FIG. 3. The algorithm is repeated periodically, typically one to three times per minute. Step 502 calls for the computation of a quantity $V = T(N/(S-1)$ called the service affinity function, where T is the computed average holding time of a call, N is the number of calls presently in the ACD and S is the number of operators present. The quantity shown is a surrogate for the estimated average delay, assuming that the number of calls in the system exceeds the number of servers. If this is not the case, the service affinity assumes a negative value which measures the ability of the ACD to serve traffic: the more negative the better able the location is to accept traffic. As shown in FIG. 5, the data elements from each ACD, and represented by the data in box 500, are used to compute the service affinities for each ACD which has provided status data since the previous cycle of the UP 112 algorithm.

For each ACD which has reported status data, step 504 uses the service affinity V to rank order the ACDs from smallest (most negative) to largest (most positive). Step 506 determines if there are any ACD members in the rank ordered list. If there are no ACDs reporting status data, the algorithm can proceed no farther. Instead, it switches off at step 508, and issues a management message explaining that it has done so. Recall from FIG. 3 node 310, that this will subsequently cause the data base 110 to default from CDS to another method of call routing.

Figure 6:
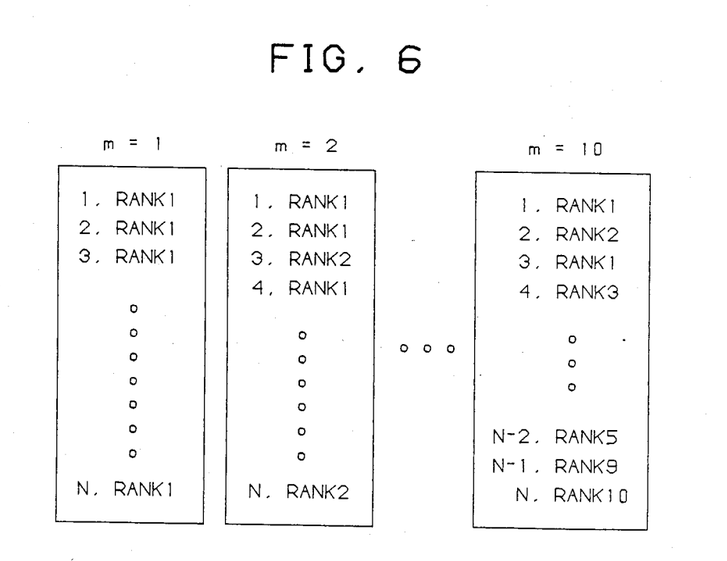
FIG. 6 shows illustrative templates which are used to determine the proportion and order of entries of each ACD in the call routing table based on the congestion data and the number of ACDs.

The next step 512 is to convert the rank ordered list into a call routing table. This is done with the use of templates conceptually shown from box 510. An illustrative set of such templates is shown in FIG. 6 for various numbers m of ACDs in the rank ordered list. These templates are constructed empirically, but according to the principle that the ACDs most able to handle traffic (smallest service affinity, which corresponds to lowest number ranks) are represented first and most frequently in the template.

The outcome of step 512 is a call routing table such as 300 which is consistent with the template, but which has the ACD identifier substituted for the rank. In the next step 514, the call routing table is transmitted to the data base 110. Although it has not been discussed for simplicity, data bases such as 110, occur in mated pairs for reliability. At step 516, if no acknowledgement is received from the active data base 110 to the transmittal of the call routing table, the table is sent to the mate (standby) data base at step 518. If again no acknowledgement is received at step 520, an error message is generated for maintenance personnel at step 522; after several such failed cycles, the UP 112 algorithm is stopped.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A method of balancing call loads between a plurality of automatic call distributors (ACDs) in a system further comprising
a plurality of switching offices, and
a data base,
the method comprising the steps of
repetitively accumulating data at the data base from each of the ACDs describing the present call congestion state of the ACD,
repetitively analyzing the data from all of the ACDs,
responsive to the step of analyzing, generating call routing information for the ACDs as a group, said call routing information containing representations of the percentage of calls to the ACD's as a group that are to be routed to each individual ACD,
querying the present state of the call routing information in response to each call at the offices directed to the ACDs, and
dynamically balancing the calls between the ACD's by routing individual ones of the calls in accordance with the percentage representations contained in the call routing information.

2. The method of claim 1 further comprising the steps of
transmitting to the data base information identifying an ACD and describing the number of available trunks at the ACD.

3. The method of claim 2 wherein the step of querying the call routing information further comprises the step of
comparing the information describing the number of available trunks at the ACD to a customer specified parameter which is less than or equal to a number of trunks to the ACD to determine if the call should be routed to the selected ACD.

4. The method of claim 3 further comprising the step of
selecting another ACD from the call routing information in response to the step of comparing.

5. The method of claim 1 further comprising the steps of
transmitting from the switching office to the data base an indication of the geographic location from which the call originated,
determining if completing the call to the selected ACD involves an intrastate or interstate call, and
selecting different telephone numbers for completing the call to the ACD according to whether the call is intrastate or interstate.

6. A method of balancing call loads between a group of automatic call distributors (ACDs) in a system comprising
a plurality of switching offices,
a data base,
first data links linking the offices and the data base,
second data links linking each of the ACDs to the data base,
the method comprising the steps of,
at each ACD,
repetitively accumulating data representative of the present ACD congestion level, and
transmitting the accumulated data to the data base,
at a switching office,
transmitting a query message containing a number identifying the ACD group to the data base in response to receipt of a call directed to the ACD group,
at the data base,
in response to the query message, determining from the present state of the congestion data from each of the ACDs a preferred ACD to which to route the call, and
transmitting a telephone number identifying the preferred ACD to the office, wherein the step of determining a preferred ACD comprises updating a call routing table at the data base in accordance with the congestion data from each of the ACDs, the call routing table containing sequential entries each identifying one of the ACDs and in which the number of entries identifying each individual ACD in relation to the overall number of entries defines the percentage of customer calls to be directed to that ACD, maintaining a pointer into the call routing table, selecting the preferred ACD from the call routing table entry pointed to by the pointer in response to the query message from the switching office, and advancing the pointer.

7. A method of balancing call loads between a plurality of automatic call distributors (ACDs) in a system further comprising a plurality of switching offices, and a data base, the method comprising the steps of repetitively accumulating data at the data base from each of the ACDs describing the present call congestion state of the ACD, repetitively analyzing the data from all of the ACDs, responsive to the step of analyzing, generating call routing information for the ACDs as a group in which the call routing information comprises indications of the relative percentages of calls to the group of ACDs that are to be routed to each of the individual ACDs, said call routing information further comprising a plurality of data records, each record identifying one of the ACDs and the total number of the records identifying the same ACD reflecting the relative percentage of calls to the group of ACDs that are to be routed to that ACD, and, in response to a call at one of the switching offices, querying the present state of the call routing information to select a preferred ACD to which to route this call.

8. A method of balancing call loads between a group of automatic call distributors (ACDs) in a system comprising a plurality of switching offices, a data base, first data links linking the offices and the data base, second data links linking each of the ACDs to the data base, the method comprising the steps of, at each ACD, repetitively accumulating data representative of the present ACD congestion level, and transmitting the accumulated data to the data base, at a switching office, transmitting a query message containing a number identifying the ACD group to the data base in response to receipt of a call directed to the ACD group, at the data base, in response to the query message, determining from the present state of the congestion data from each of the ACDs a preferred ACD to which to route the call, and transmitting a telephone number identifying the preferred ACD to the office, wherein the data base includes an update processor for receiving the congestion data from each of the ACDs and for generating a call routing table by repetitively computing from the congestion data for each ACD a value representing a level of call congestion at the ACD, and building the call routing table by rank ordering the congestion values in a prescribed manner.

9. The method of claim 8 wherein the congestion data from each ACD includes a number of occupied telephone answering positions, a number of present calls being processed by the ACD and a present average expected holding time for an arriving call.

10. The method of claim 9 wherein the step of calculating a congestion level value for each ACD further comprises the step of computing a function V based on the number of operators S present in the ACD, the number of calls N present in the ACD and the present average holding time T of a call in the ACD.

11. The method of claim 10 further comprising the step of evaluating the formula $V = T(N/(S-1))$.

12. The method of claim 8 wherein the step of computing a congestion level value further comprises the steps of computing congestion level values only for ones of the ACDs that have transmitted updated congestion data to the update processor since the last computation of congestion level values, and the step of building the call routing table further comprises the step of entering data into the call routing table specifying a number of calls and order to be routed to the most preferred ACD, a number of calls and order to be routed to the next most preferred ACD, and so on, all in accordance with the number of ACDs that have updated the respective congestion data since the last computation of congestion level values.

13. A method of balancing call loads between a plurality of automatic call distributors (ACDs) in a system comprising a plurality of switching offices, a data base, first data links linking the offices and the data base, second data links linking each of the ACDs to the data base, the method comprising the steps of, at each ACD, repetitively accumulating data representative of the present ACD congestion level, transmitting the accumulated data to the data base, at the database, repetitively analyzing the congestion data from each ACD and, in response thereto, generating a call routing table containing indications of the relative percentage of calls that are to be routed to each ACD, at a switching office, transmitting a query message to the data base in response to receipt of a call directed to the ACDs.

at the data base, in response to the query message, determining from the call routing table a preferred ACD to which to route the call, and transmitting a telephone number identifying the preferred ACD to the switching office.

14. The method of claim 13 wherein the step of determining a preferred one of the ACDs to which to route the call further comprises the steps of updating a call routing table at the data base in accordance with the congestion data from each of the ACDs, the call routing table containing sequential entries each identifying one of the ACDs and in which the number of entries identifying each individual ACD in relation to the overall number of entries defines the percentage of total customer calls to be directed to that ACD.

15. The method of claim 13 wherein the data base further comprises an update processor for receiving the congestion data from each of the ACDs and for performing the step of generating a call routing table having plural entries, each identifying an individual ACD, in response thereto, the number of entries in the call routing table for each individual ACD defining the percentage of calls to be routed to that ACD.

16. The method of claim 13 wherein the step of determining a preferred one of the ACDs to which to route the call further comprises the step of interrogating status information maintained at the data base to determine the instant availability of the preferred ACD, and, if the preferred ACD is unavailable, determining from the present state of the congestion data from each of the ACDs a next preferred ACD.

* * * * *